United States Patent Office 2,702,814
Patented Feb. 22, 1955

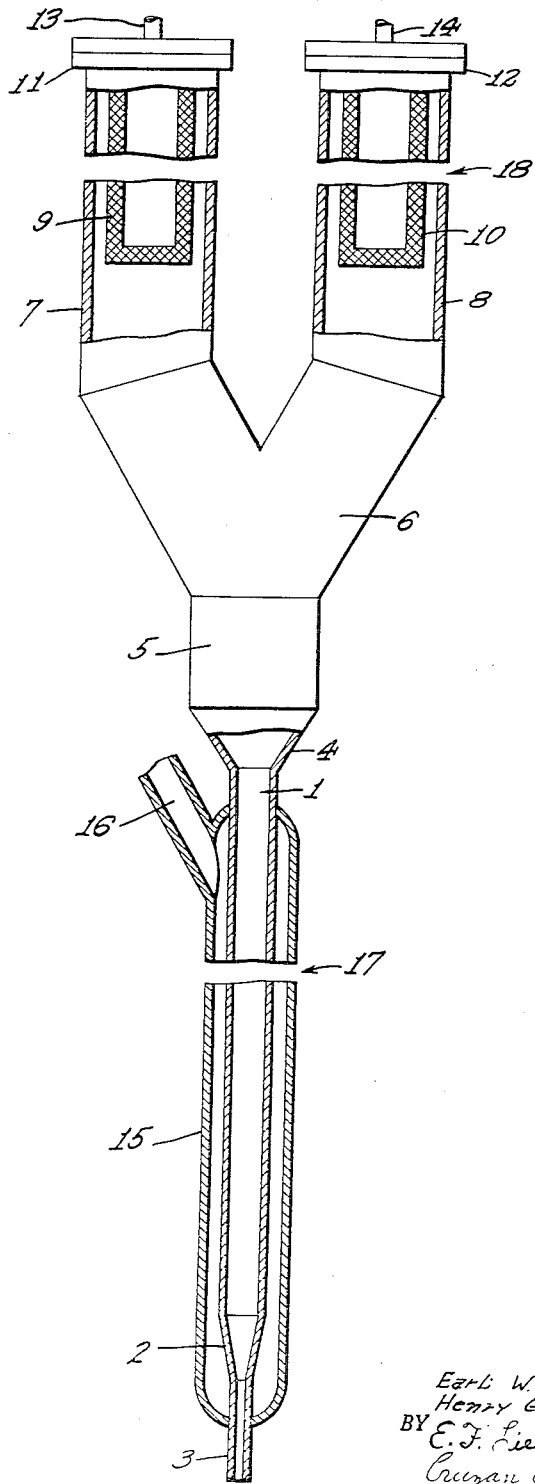

2,702,814

SYNTHESIS OF ORGANIC COMPOUNDS

Earl W. Riblett, Tenafly, and Henry G. McGrath, Elizabeth, N. J., assignors to The M. W. Kellogg Company, Jersey City, N. J., a corporation of Delaware Application April 1, 1949, Serial No. 84,853

5 Claims. (Cl. 260—449.6)

This invention relates to an improved method for hydrogenating carbon oxides to produce hydrocarbons and oxygenated organic compounds. The carbon oxides treated comprise primarily carbon monoxide and carbon dioxide, but may include also other organic compounds which contain the carbonyl group, such as ketones, aldehydes, acyl halides, organic acids and their salts and esters, acid anhydrides, amides, etc., and whose reaction with hydrogen to produce other oxygenated compounds and hydrocarbons is promoted by catalysts and reaction conditions which are effective to promote the reaction of hydrogen with carbon monoxide. While the improved process is applicable to the hydrogenation of these compounds of carbon and oxygen, to produce both hydrocarbons and oxygenated organic compounds, the invention is particularly applicable to the large scale production of hydrocarbons by the hydrogenation of carbon monoxide. This application is a continuation-in-part of our prior and copending application Serial No. 550,801, filed August 23, 1944, and now abandoned.

The object of this invention is to provide an improved supported catalyst for the hydrogenation of carbon oxide by contact with the catalyst in finely-divided form.

Another object of this invention is to provide a novel catalyst composition for use in the hydrogenation of carbon oxide.

Various other objects and advantages will become apparent to those skilled in the art from the accompanying description and disclosure.

The above-described reactions may be carried out in a highly advantageous manner by passing the reactants as a gas stream upwardly in a reaction zone through a mass of finely-divided solid catalyst. In one embodiment of this invention the gas stream is passed through the catalyst powder at a linear velocity which is effective to suspend the catalyst in the gas stream in a dense fluidized pseudo-liquid phase in which the particles of catalyst circulate at a high rate. If the velocity of the gas stream is maintained sufficiently low, the catalyst mass assumes a condition which is described as "pseudo-liquid" for the reason that the mass exhibits many of the properties of a true liquid, particularly as to flowability and density. The gas velocity necessary to produce this condition depends somewhat upon the character and condition of the catalyst, but it is preferred ordinarily to pass the gas stream through the catalyst at a velocity which is sufficiently low to produce the above described condition but sufficiently high without substantial entrainment to produce turbulence in the mass whereby the particles circulate at a high rate throughout the mass of contact material.

Under the conditions described above, the fluidized mass of contact material is quite dense, resembling in this respect a settled mass of the same material. The density of the fluidized mass may be not less than half that of the settled mass. The fluidized catalyst mass is suspended in the gas stream but there is no movement of the catalyst mass as a whole along the path of flow of the gas stream. Thus, while the catalyst mass is suspended in the gas stream, it is not entrained therein. However, a small proportion of the particles of the fluidized mass may become entrained and carried away in the gas stream emerging from the dense pseudo-liquid catalyst mass.

To produce the fluidized catalyst mass the gas stream is passed into the bottom of the reactor through a relatively small inlet at an inlet velocity such that solids in the reactor are prevented from passing downwardly out of the reactor through the gas inlet. The horizontal dimension of the reactor and the rate of flow of the gas stream into the reactor are controlled to produce in the reactor a gas velocity effective to maintain the catalyst mass in the fluidized condition. This velocity is defined ordinarily in terms of the velocity of the gas stream through an empty reactor which is referred to as the superficial velocity. Ordinarily, superficial velocities of 0.1 to 10 feet per second are employed for pseudo-liquid type operations; the actual velocity depends on such factors as catalyst density, composition and size.

It is preferred ordinarily in pseudo-liquid type operations to provide a reactor having a volume substantially greater than the desired volume of the fluidized catalyst mass. In such a large reactor the catalyst forms the relatively dense fluidized mass described above which occupies the lower part of the reactor and which is referred to hereafter as the dense phase. In the upper part of the reactor the density of catalyst in the gas is substantially less and of a different order of magnitude than the density of the catalyst in the dense phase. The upper phase may be referred to as a diffuse phase. In the diffuse phase there is substantial disengagement by settling of solids which are lifted above the dense phase by the gas stream. Depending upon the gas velocity and the particle size of the catalyst mass, such settling may effect substantially complete disengagement of solids from the gas stream. Ordinarily, however, a substantial proportion of the particles comprising the catalyst mass has a free settling rate less than the superficial velocity of the gas stream, whereby a small proportion of the catalyst is carried from the reactor in the exit gas stream in the absence of special means to effect separation of the suspended solids from the gas stream.

Between the dense catalyst phase and the upper diffuse phase there is an interface which is a relatively narrow zone in which the concentration of solids in the gas stream changes from the high concentration of the dense phase to the low concentration of the diffuse phase.

In order to produce the desired turbulent pseudo-liquid condition in the dense phase, it is desirable that at least a substantial proportion of the contact material consist of particles whose free settling rate is less than the superficial velocity of the gas stream. The mass of contact material may consist advantageously of a mixture of particles varying in size from 40 to 400 microns (average diameter), although particles of larger or smaller diameter may be present.

The pseudo-liquid type operation is initiated by charging the reactor with the desired quantity of the contact material. Thereafter, the contact mass in the reactor is fluidized by the passage of a gas stream upwardly therethrough at the proper velocity. Alternatively, a gas stream may be passed through the empty reactor, while catalyst is charged to the reactor at a rate in excess of the rate at which catalyst is carried out of the reactor in the gas stream. In this manner, the desired volume of fluidized dense phase may be built up. During the operation it may be necessary to add catalyst to the reactor continuously or intermittently to replace deactivated catalyst, or to replace catalyst carried from the reactor with the product gas stream.

The reaction is initiated by heating the fluidized contact mass to a temperature effective to initiate the reaction. Thereafter, it is necessary to cool the fluidized contact mass to maintain the reaction temperature at the desired level. It is a feature of the pseudo-liquid method of operation that the circulation of the particles in the fluidized mass promotes rapid and efficient heat exchange between the various parts of the fluidized mass whereby a substantially uniform condition in the mass is maintained. Consequently, the excess heat of reaction may be withdrawn from the reaction zone by cooling a part of the fluidized mass. This may be effected in whole or in part by introducing the reaction gas in a cold condition, but it is necessary, ordinarily, to provide additional means for withdrawing heat from the contact mass. This may be provided for by indirect heat exchange means of the character indicated below in the example or by introducing a cold gas or vaporizable liquid directly into the dense phase.

Another mode of operation involves the use of sufficiently high gas velocities to entrain the contact material such that all of it continuously moves in the direction of flow of the gases. The entrained contact material passes from the reaction zone with the effluent gases to a solids separator, such as a conventional settling zone or cyclone separator. Contact material is separated from the effluent gases and recycled, after aeration and/or stripping, to the reaction zone. The concentration of contact material in the gases in the reaction zone is materially less than characteristic of dense phase operations. Generally, superficial gas velocities above 5 feet per second are employed, preferably 8 to 40 feet per second or higher, depending on such factors as catalyst density, composition and size, and reaction conditions employed. As with dense phase operations, the reaction zone may be cooled indirectly by conventional means, or directly by injection of a cooling medium therein.

The catalysts, or contact material, ordinarily employed in the reaction of hydrogen and carbon oxides, include hydrogenating metals alone or in combination with each other which may or may not be employed in combination with activating metal oxides and supporting materials. The hydrogenating metal catalysts which are employed ordinarily include the metals of group VIII of the periodic system. While metallic iron or iron oxide may be employed satisfactorily without the use of supporting materials, it is preferred to employ the catalytic metals of group VIII, particularly those having an atomic number higher than 26, such as cobalt and nickel, in combination with suitable supports to be discussed hereinafter. In addition, activating metal oxides may be incorporated in such contact materials. These include alkalis such as sodium, potassium, barium oxides, etc., alumina, silica, titania, thoria, zinc oxide, manganese oxide, magnesia and chromium oxides. For example, a catalyst may comprise metallic cobalt in combination with approximately one-half to five times, preferably one to three times, its weight of support and approximately 0.01 to 0.5, preferably 0.05 to 0.2, its weight of a difficultly reducible metal oxide, such as thoria or magnesia.

According to this invention, it has been discovered that catalysts in combination with supports of the character previously employed, such as kieselguhr, are inferior, when used in the form of a fluidized powder as described above. It has been found that superior catalysts for use in the form of fluidized powders may be produced by employing as a support a bentonite type clay. Bentonite clays contain montmorillonite as their essential ingredients. These clays, in many instances, however, contain certain impurities which are injurious to the catalyst or to the property of the clay as a support. These clays may be improved for use as a support in fluidized processes by acid treatment, such as treatment with sulfuric, hydrochloric and hydrofluoric acids. Such acid treatments remove impurities and convert the clay to hydrogen montmorillonite, but, in general, these treatments do not effect its crystalline structure. The acid treatment may also improve the porosity and surface area of the support. Bentonite clays are commercially available in the market under the trade names "Filtrol" and "Super-Filtrol." "Super-Filtrol" is an acid treated bentonite clay and is particularly adaptable as a support for hydrogenation catalysts for use in processes as described.

The supported catalyst of this invention is prepared by precipitating a hydrogenating metal from an aqueous solution thereof and admixing "Super-Filtrol" or bentonite clay as a slurry with the aqueous solution containing the precipitate of the hydrogenating metal. The procedural steps of precipitating the hydrogenating metal have been found to be very important in preparing an active catalyst. Accordingly, an aqueous solution of a water soluble hydrogenating metal salt is prepared. A second alkaline solution is prepared. The first solution of the hydrogenating metal is added slowly, with stirring, to the aqueous alkaline solution whereby a fine precipitate of the corresponding water insoluble hydrogenating metal salt is formed. The bentonite support may be added to either of the solutions prior to precipitation such that the precipitate is effected in the presence of suspended support. Alternatively, the bentonite support may be added to the resulting aqueous mixture after precipitation has been effected. The slurry obtained in either case, after thorough mixing, is dried, and the dried material is treated at an elevated temperature with a reducing gas, such as hydrogen, to reduce the hydrogenating metal salt to the metal. The granular material may be ground before or after the reduction treatment to produce the desired particle size distribution. Any promoting oxides which are employed, such as thoria and magnesia, may be incorporated by precipitating them from a solution of their water soluble metal salts simultaneously with the precipitation of the hydrogenating metal, or after the precipitation of the hydrogenating metal. It is important, in preparing the catalyst, to add the solution containing the water soluble hydrogenating metal salt to the alkaline solution in order to precipitate the hydrogenating metal. Employing the reverse operation of adding the alkaline solution to the solution of the water soluble hydrogenating metal salt does not produce as active a catalyst as the method employed in the present process. This difference in activity may be due to the colloidal nature of the precipitate, but such theory should not be construed as unnecessary limiting to the present invention. In any event, the catalysts prepared as set forth herein are more active and produce higher yields of normally liquid organic compounds than catalysts prepared by other methods. The dried precipitate, prior to reduction, is gray-brown in color, and after reduction is black.

The hydrogenating catalysts containing supports previously employed are not suitable for use in the hydrogenating of a carbon oxide because their activities are relatively low. Moreover, these previously used supported catalysts are difficult to maintain in a fluidized condition when employed in fluidized operations, because of the relatively narrow range of velocities by which they can be fluidized. On the other hand, the bentonite type support results in a hydrogenation catalyst of optimum activity for the hydrogenation of carbon oxides, which can be maintained in a fluidized condition over relatively wide gas velocities and reaction conditions.

The invention will be described in more detail by reference to the specific examples of the use of the improved catalytic contact material in the conversion of hydrogen and carbon monoxide to normally liquid organic products. The accompanying drawing is a view in elevation, partly in cross-section, of the reactor employed in carrying out the specific operation referred to in the example.

Referring to the drawing, reactor 1 consists of a length of extra heavy 2-inch steel pipe which is 153 inches long and has inside and outside diameters of 1.94 inches and 2.38 inches, respectively. Reactor 1 is connected by a conical section 2 to an inlet pipe 3 made of extra heavy half-inch steel pipe having an inside diameter of 0.55 inch. Reactor 1 is connected at the top, by means of conical section 4, with an enlarged conduit 5 comprising a length of 6-inch extra heavy steel pipe having an inside diameter of 5.76 inches. Conical section 4 and conduit 5 constitute an enlarged extension of reactor 2 which facilitates disengagement of catalyst from the gas stream after passage of the latter through the dense catalyst phase.

Conduit 5 is connected by means of manifold 6 with conduits 7 and 8 which comprise other sections of extra heavy 6-inch steel pipe. Conduits 7 and 8 contain filters 9 and 10 which are constructed of porous material which is permeable to the gas and vapors emerging from the reaction zone but substantially impermeable to the catalyst particles carried by entrainment in the gas stream. Filters 9 and 10 are cylindrical in shape and closed at the bottom ends. They are dimensioned in relation to conduits 7 and 8 to provide a substantial annular space between the filter and the inner wall of the enclosing conduit for the passage of gases and vapors and entrained catalyst upwardly about the outer surface of the filter. The upper ends of filters 9 and 10 are mounted in closure means 11 and 12 in a manner whereby the gases and vapors must pass through either filter 9 or filter 10 to reach exit pipes 13 and 14. Each of filters 9 and 10 is approximately 36 inches long and 4½ inches in outside diameter, the filter walls being approximately ¾ of an inch thick.

The greater part of reactor 1 is enclosed in a jacket 15 which extends from a point near the top of the reactor to a point sufficiently low to enclose the 3 inch length of conical section 2 and approximately 5 inches of pipe 3. Jacket 15 comprises a length of extra heavy 4-inch steel pipe having an inside diameter of 3.83 inches. The ends of jacket 15 are formed by closing the ends of the 4-inch pipe in any suitable manner, as shown. Access to the interior of jacket 15 is provided by an opening 16 in the top thereof through a 2-inch steel pipe. Jacket 15 is adapted to contain a body of liquid for temperature control purposes, such as water, or "Dowtherm" (a constant boiling mixture of diphenyl and diphenyl oxide). The vapors which are evolved by the heat of reaction are withdrawn at 16, condensed, and returned through 16 to the body of temperature control fluid in jacket 15. The temperature control fluid in jacket 15 is maintained under a pressure at which the liquid boils at the temperature desired in jacket 15. Heating means, not shown, are provided in connection with jacket 15 to heat the temperature control fluid therein to any desired temperature.

In order to show all the essential parts of the reactor and associate catalyst separation means on a single sheet, a large proportion of the apparatus has been eliminated by the breaks at 17 and 18. For a clear understanding of the relative proportions of the apparatus, reference may be had to the over-all length of the apparatus, from the bottom of jacket 15 to exit pipes 13 and 14, which is 224 inches. In each of breaks 17 and 18 the portion of the apparatus eliminated is identical with that portion shown immediately above and below each break.

In the operations carried out in the apparatus of the drawing the catalyst recovery means comprising filters 9 and 10 is effective to separate substantially completely entrained catalyst from the outgoing stream of gases and vapors. The disengagement of solids from the gas stream is promoted by the lowered velocity of the gas stream in conduit 5 and remaining solids are separated on the outer surfaces of filters 9 and 10. The latter are employed alternatively during the operation so that the stream of gases and vapors and entrained solids passes from conduit 5 through either the left or right branches of manifold 6 into conduit 7 or conduit 8. During the alternate periods, the filter which is not in use is subjected to a back pressure of inert gas which is introduced at a rate sufficient to dislodge catalyst which has accumulated on the outer surface of the filter during the active period. Such "blow-back" gas and dislodged catalyst flows downwardly in the conduit enclosing the filter and into manifold 6 in which the "blow-back" gas is combined with the reaction mixture flowing upwardly from conduit 5. The greater part of the catalyst thus dislodged settles downwardly into the reactor and is thus returned for further use.

In the operation of the apparatus of the drawing the desired quantity of powdered catalyst is introduced directly into the reactor through a suitable connection, not shown, in conduit 5. After any desired preliminary activation treatment the temperature of the fluid in jacket 15 is adjusted, by the heating means mentioned above and by the pressure control means, to the temperature desired to be maintained in jacket 15 during the reaction. After the catalyst mass has reached the reaction temperature, the introduction of the reaction mixture through pipe 3 is initiated. The reaction mixture may be preheated approximately to the reaction temperature prior to its introduction through pipe 3, or the reactants may be heated to the reaction temperature through the passage thereof through that portion of pipe 3 which is enclosed by jacket 15 and by contact with the hot catalyst. It will be understood, furthermore, that the enclosure of pipe 3 in jacket 15 is not necessary to the invention and that the reactants may be heated to the reaction temperature solely by contact with the hot catalyst.

Pipe 3 is dimensioned with respect to reactor 1 and the desired superficial velocity whereby the velocity of the gases passing through pipe 3 is sufficiently high to prevent the passage of solids downwardly into pipe 3 against the incoming gas stream. A ball check valve, not shown, is provided in pipe 2 to prevent solids from passing downwardly out of the reactor when the gas stream is not being introduced into pipe 3.

*Example 1*

A catalyst for promoting the reaction of carbon monoxide with hydrogen was prepared as follows: 10,000 grams of cobalt nitrate, $Co(NO_3)_2.6H_2O$ and 1910 grams of magnesium nitrate, $Mg(NO_3)_2.6H_2O$, were dissolved in 50 liters of treated water. 6100 grams of sodium carbonate, $Na_2CO_3.H_2O$, were dissolved in 50 liters of treated water. Both solutions were heated to the boiling point and the nitrate solution was then added to the carbonate solution with continuous stirring. After the resulting mixture had been stirred thoroughly, 4,000 grams of finely-divided "Super-Filtrol" (previously dried at 900° F. for 1.5 hours) at a temperature of 210° F. were added to the solution with vigorous stirring. After thorough stirring, the resulting mixture was then filtered under a pressure of 30 pounds per square inch gage. The filter cake was washed in the filter with 160 gallons of treated water at 180° F. The washed filter cake was dried overnight at room temperature by means of a blower. The partially dried material was dried at 210° F. to a moisture content of about 54% and was then extruded through ⅜ inch dies. The extruded material was then dried overnight at 210° F. to obtain a product having a moisture content of about 16%. This material was then ground to produce a granular mass finer than 6 mesh but coarser than 20 mesh. The granular material thus produced was reduced in an oven by means of a circulating stream of hydrogen from which water and $CO_2$ were removed continuously. The temperature of the mass of catalyst during this operation was raised to a final temperature of 700° F. during which time the production of water ceased. The reduced catalyst was then ground in an atmosphere of $CO_2$ to a powder of the desired size. The following is a screen analysis of this powder:

| Size range: | Weight per cent |
|---|---|
| 40+ | 0.0 |
| 40/60 | 45.2 |
| 60/80 | 22.8 |
| 80/100 | 6.7 |
| 100/120 | 4.8 |
| 120/140 | 4.3 |
| 140/200 | 5.7 |
| 200/ pan | 10.5 |

This catalyst had the following approximate composition in parts by weight: Co:0.15 MgO:2.0 "Super-Filtrol."

Reactor 1 was purged by means of $CO_2$ and, while a small stream of $CO_2$ was passed through reactor 1, 9 pounds of the catalyst prepared as described above were introduced while maintained in an atmosphere of $CO_2$. The catalyst mass was then heated to approximately 300° F. by heating the water bath in jacket 15. At that point a small stream of hydrogen was substituted for the $CO_2$ as the aerating medium. Heating was continued to a temperature of approximately 360° F. at which point the passage of a stream of reaction gas, consisting essentially of $H_2$ and CO in the ratio of approximately 2:1, was initiated. The reaction temperature was then raised during a period of 11 hours to 400° F.

This operation was continued for approximately 650 hours during which time the gas was passed through the reactor at varying experimental conditions. The reaction temperature varied from 380° F. to 425° F. The pressure varied from atmospheric to 50 pounds per square inch (gage). The feed gas, which consisted substantially entirely of $H_2$ and CO in ratios of 2:1 to 3:1, was charged to the reactor at space velocities of 330 to 875 volumes of gas (measured at standard conditions of temperature and pressure) per volume of dense catalyst phase per hour. A high rate of conversion to liquid hydrocarbon products was maintained throughout the operation, which was terminated arbitrarily. Throughout this operation the catalytic contact mass exhibited the desired dense fluidized pseudo-liquid condition with the result that uniform temperature conditions were maintained throughout the reactor at all times. At no time during the operation was there observed any accumulation of deposits on the contact material which interfered with the fluidized condition. Examination of the catalyst after the termination of the operation showed it to be a finely-divided non-adherent easily fluidizable material. After 516 hours of the operation the catalyst was revivified by treatment with a stream of hydrogen at 700–850° F. for 6 hours. The function of this regeneration treatment appeared to be the reduction of oxides formed on the catalyst surface during the operation rather than the removal of waxy deposits.

For a specific example of the operating conditions for production rate in this operation, reference is made to a 12 hour period occurring after 147 hours of operation. In this period the feed gas consisted of 65.5% $H_2$, 29.7% CO and 4.8% inerts. This gas was charged through pipe 3 at a temperature of 217° F., at the rate of 118.5 standard cubic feet per hour under a pressure equivalent to an outlet pressure of 44 pounds per square inch. This produced a superficial inlet velocity of 0.62 feet per second. The resulting dense fluidized mass of contact material rose to a height of 8.6 feet in 15 seconds, the reactor corresponding to a density of 46 pounds per cubic foot. The space velocity was, therefore, 685 standard cubic feet per hour per cubic foot of fluidized contact mass. This corresponded to 2.54 standard liters of gas per hour per gram of cobalt. During this period, the average temperature in the reactor varied from a maximum of 413° F. at a point 2.5 feet above pipe 3 to a minimum 386° F. at a point 6 inches above pipe 3. The average temperature in the dense phase during this period was 402° F. This resulted in the reaction of 63.4% of the CO charged to the operation. Of this, 5.1% was converted to hydrocarbons having molecular weights lower than that of propylene and 57.9% was converted to a liquid hydrocarbon product comprising hydrocarbons of 3 or more carbon atoms per molecule. The yield of this latter product was equivalent to 149 cc./m.$^3$ of synthesis gas. The fraction of this oil which condensed substantially at room temperature contained 6.9 mol per cent olefins.

*Example II*

A catalyst was prepared in accordance with the following procedure:

A cobalt nitrate solution was prepared by dissolving 10,000 grams of $Co(NO_3)_2 \cdot 6H_2O$ in 50 liters of water. A sodium carbonate solution was prepared by dissolving 6,100 grams of $Na_2CO_3 \cdot H_2O$ in 50 liters of water. With both solutions at the boiling point the cobalt nitrate solution was added with stirring to the sodium carbonate solution. After thorough stirring, 4,000 grams of dried "Super-Filtrol" preheated to 180–200° F. were added with vigorous stirring. The slurry thus obtained was filtered and the filter cake was reslurried in 30 gallons of treated water. After standing for several hours, the slurry thus obtained was heated to boiling with vigorous stirring, after which the slurry was filtered again. During this operation the filter cake was washed with 300 gallons of hot treated water. The filter cake thus obtained had a water content of approximately 70 weight per cent. This material was partially dried at room temperature to a water content of approximately 57% and was then extruded through a ⅜ inch diameter orifice. The extruded material was heated overnight in an oven at 420° F. The material thus obtained was in the form of hard lumps and had a water content of approximately 7.6 weight per cent. This material was then ground in a Braun disc mill and screened to collect material passing through a 40 mesh sieve. Material which did not pass the sieve was recycled to reduce the batch to a size smaller than 40 mesh.

The following is a screen analysis of this powder:

| Size range: | Weight per cent |
|---|---|
| 40+ | Trace |
| 40/60 | 5.0 |
| 60/80 | 6.9 |
| 80/100 | 4.0 |
| 100/120 | 1.0 |
| 120/140 | 9.4 |
| 140/200 | 12.9 |
| 200/pan | 60.8 |

6.3 pounds of this material were charged to reactor 1, this amount being chosen to produce 5.8 pounds of catalyst in the reactor after reduction. The unit was flushed out with nitrogen and then hydrogen was passed in through pipe 3. Jacket 15 was filled with a suitable temperature control fluid such as "Dowtherm," and by heating this fluid in the manner described above the temperature of the catalyst mass was gradually raised. After the temperature of the catalyst was raised to 400° F. the rate of introduction of hydrogen was increased to 40 cubic feet per hour and the temperature was raised, while operating at that velocity, to 700° F. This operation was continued until the formation of water ceased, after which the hydrogen flow rate was lowered to 5 cubic feet per hour and the temperature was lowered to 300° F. The catalyst composition was Co:2 "Super-Filtrol."

The "Dowtherm" was then removed from jacket 15 and replaced with water at a temperature equivalent to a catalyst temperature of 300° F. The introduction of feed gas, consisting essentially of two parts of hydrogen and one part of carbon monoxide, was then initiated at a space velocity of 333 standard volumes per hour per volume of dense catalyst phase. The temperature was raised rapidly during two hours to 360° F. and thereafter was raised to 400° F. in a space of 14 hours. The operation was continued thereafter under various experimental conditions for 1,115 hours at the end of which time the unit was shut down arbitrarily and the catalyst withdrawn for examination. During this time the average temperature in the reaction zone varied from a minimum of 380° F. to a maximum of 460° F. and the pressure varied from atmospheric to 50 pounds per square inch (gage). The feed gas consisted substantially of hydrogen and CO in ratios of 2:1 to 3:1 throughout this period, and it was charged to the reactor at space velocities varying from 175 to 1200 standard volumes per hour per volume of dense catalyst phase.

Throughout this period the contact material was observed to remain in the desired dense fluidized pseudoliquid condition whereby uniform temperature conditions throughout the dense phase were observed. There was no deposition of material on the surfaces of the contact material which interfered in any way with the fluidizable material of that character. At the end of this operation, as was the case at the end of Example I, the accumulation of deposits on the contact material was found to amount to less than 1 weight per cent of the contact material. Such deposits consisted of waxy oil and carbon. In spite of such deposits, however, the contact material remained perfectly dry and non-adherent throughout the operation.

For a specific example of the conditions and product obtained during this operation reference is made to a 24 hour period occurring after 531 hours of operation. During this operation the average temperature in the reactor varied from approximately 450° F. at a point 6 inches above pipe 3 to 433° F. at a point 6.5 feet above pipe 3. During this operation the feed gas, containing 30.0% CO, 61.7% $H_2$, and small amounts of $CO_2$, $CH_4$ and $N_2$, was introduced through pipe 3 at a pressure of 47 pounds per square inch (gauge). This produced a pressure of 45 pounds at the outlet. Under these conditions the dense bed had a depth of approximately 5.5 feet, corresponding to a density therein of 49 pounds cubic foot. The inlet superficial velocity was 0.75 feet per second. The feed gas was charged at the rate of 1170 cubic feet (measured at standard conditions of temperature and pressure) per hour per cubic foot of dense phase. This corresponded to 5.0 liters of gas per hour per gram of cobalt. The gas was charged at room temperature and was preheated to the reaction temperature during the passage thereof through pipe 3 and by contact with the contact mass. 40% of the carbon monoxide charged during this period was reacted, of which 11.4% was converted to hydrocarbons of lower molecular weight than propylene and 27.0% was converted to a liquid product composed of hydrocarbons of three or more carbon atoms per molecule. The material that condensed from the reactants at room temperature and operating pressure had an initial boiling point of 194° F. and an end point of 657° F. The olefin content of this hydrocarbon liquid was 2.3%.

*Example III*

This example shows a comparison between a catalyst prepared in the manner of this invention substantially the same as that prepared in Example I, and a catalyst of the same composition but prepared by adding the alkaline solution to the solution of the water soluble salt of the hydrogenating metal. The composition of the catalyst prepared by both of these methods was Co:0.15 MgO:2.0 Super Filtrol (acid treated bentonite). All the solution concentrations, temperature of precipitation, etc., were identical with both preparations. During the precipitation of the catalyst prepared in the manner of this invention, no difficulty was encountered. On the other hand, during the precipitation of the catalyst prepared by addition of the alkaline solution to the aqueous solution of the water soluble salt of the hydrogenating metal, rapid evolution of carbon dioxide was noticed, which caused frothing of the mixture. The evolution of carbon dioxide required that the precipitation step be effected slowly.

The catalysts thus prepared were tested in our petroleum atmospheric test units. Each catalyst was charged to the respective unit in the form of 8 to 12 mesh fragments. The catalysts were reduced at 800° F. for four hours with hydrogen. Thereafter, a synthesis feed gas comprising hydrogen and carbon monoxide in the ratio of about 1.7:1 was passed through the reduced catalysts in the respective unit at a temperature of 350° F. The catalyst prepared by method I was that prepared by the method of this invention. The catalyst prepared by method II was that catalyst prepared by adding the alkaline solution to the aqueous solution of the water soluble salt of the hydrogenating metal. The temperatures of the test units were raised to about 370° F. for test purposes. The results observed during the test periods after reaching 370° F. are summarized in the following table:

COMPARATIVE TESTS OF SUPPORTED COBALT CATALYSTS

|  | Prepared By Method— | | | |
|---|---|---|---|---|
|  | I | | II | |
| Hours on Condition | 24 | 12 | 24 | 12 |
| Total Hours of Operation | 46 | 82 | 46 | 82 |
| Operating Conditions: | | | | |
| Catalyst Temperature, ° F | 370 | 373 | 365 | 373 |
| Gas Rate, Liters/Hr./Gm. Co | 0.93 | 1.03 | 0.92 | 0.96 |
| Results: | | | | |
| Contraction, Percent | 57 | 70 | 66 | 56 |
| Condensed Oil, cc./m.$^3$F.F | 98 | 140 | 103 | 101 |
| Condensed H$_2$O, cc./m.$^3$F.F | 157 | 190 | 169 | 134 |
| Discharged Catalyst: | | | | |
| Wt. Percent Oil and Wax | 0.5 | 0.5 | 0.7 | 0.7 |
| Wt. Percent Carbon | 2.7 | 2.7 | 2.9 | 2.9 |

The results observed during the test indicate substantially the same activity of the catalyst during the initial period of operation but, upon use, the catalyst prepared by method II became less active with lower yields and lower conversions. On the other hand, upon use, the catalyst prepared by method I indicated substantially improved yields and increased conversion. The catalyst prepared by method I was definitely superior to the catalyst prepared by method II.

The results obtained with various bentonite type supported catalysts are shown in the following table employing comparable conditions of operation. All of these catalysts shown in the following table were prepared in the manner described in this application. Although the metal salt was precipitated, in most instances, by a sodium carbonate solution, an ammonium carbonate or potassium carbonate solution could have been used and actually have been used in the preparation of other similar catalysts.

| Composition | Cat. No. | Optimum | | |
|---|---|---|---|---|
| | | Temp., ° F. | Oil, cc./m.$^3$ | H$_2$O, cc./m.$^3$ |
| Co:2 SF | 215-2B | 408 | 115 | 178 |
| Co:0.47 MnO:2 SF | 241 | 457 | 87 | 135 |
| Co:0.15 MgO:2 SF | 248 | 383 | 174 | 231 |
| Co:0.15 MgO:4 SF | 249 | 399 | 92 | 173 |
| Co:0.15 MgO:6 SF | 250 | 364 | 2 | 7 |
| Co:0.15 MgO:8 SF | 251 | 389 | 0 | 4 |
| Fe:1.25 SF | 263-2 | 460 | 23 | 25 |
| Fe:0.3 Cu:0.05 Ni:1.25 SF | 265-2 | 460 | 74 | 37 |
| Co:0.25 ThO$_2$:2 SF | 270 | 405 | 171 | 205 |
| Co:0.25 ThO$_2$:1 SF | 271 | 390 | 168 | 203 |
| Co:0.5 ZnO:2 SF | 272-3 | 394 | 110 | 158 |
| Co:0.5 ZnO:1 SF | 273 | 375 | 120 | 188 |
| Fe:0.3 Cu:0.05 Co:1.25 SF | 280 | 460 | 48 | 57 |
| Fe:0.3 Cu:1.25 SF | 281 | 460 | 24 | 32 |
| Fe:0.3 Cu:0.05 Ni:2 SF | 282 | 475 | 24 | 34 |
| Fe:0.3 Cu:0.05 Co:1.25 SF (0.1% K$_2$O) | 288 | 470 | 46 | 58 |
| Fe:0.3 Cu:0.05 Co:1.25 SF (0.5% K$_2$O) | 289 | 465 | 86 | 50 |
| Fe:0.3 Cu:0.05 Co:1.25 SF (1.0% K$_2$O) | 293 | 460 | 73 | 34 |
| Fe:0.3 Cu:0.05 Co:1.25 SF (2.0% K$_2$O) | 294 | 470 | 73 | 35 |
| Fe:0.3 Cu:0.05 Co:0.03 Al$_2$O$_3$:1.25 SF (0.5% K$_2$O) | 295 | 450 | 36 | 51 |
| Fe:0.3 Cu:0.1 Co:1.25 SF (0.5% K$_2$O) | 299 | 460 | 45 | 67 |
| Co:0.3 Cu:1.25 SF (0.1% K$_2$O) | 300 | 454 | 46 | 47 |
| Fe:0.3 Cu:0.5 Co:1.25 SF | 301 | 450 | 53 | 146 |
| Fe:0.5 Al$_2$O$_3$:1.25 SF (0.1% K$_2$O) | 302 | 455 | 23 | 30 |
| Fe:0.05 Cr$_2$O$_3$:1.25 SF (0.1% K$_2$O) | 304 | 475 | 39 | 39 |
| Fe:0.3 Cu:0.05 Co:1.25 SF (1.0% Na$_2$B$_4$O$_7$) | 305 | 460 | 42 | 53 |
| Co:0.5 MnO:2 SF | 315 | 390 | 126 | 199 |
| Fe:0.3 Cu:0.02 MnO:1.25 SF (0.5% K$_2$O) | 317 | 465 | 78 | 48 |
| Fe:0.3 Cu:0.02 MgO:1.25 SF (0.5% K$_2$O) | 318 | 470 | 87 | 40 |
| Fe:0.3 Cu:0.05 MoO$_2$:1.25 SF (0.5% K$_2$O) | 323 | 465 | 60 | 41 |
| Fe:0.3 Cu:0.01 MnO:1.25 SF (0.5% K$_2$O) | 325 | 470 | 70 | 44 |
| Fe:0.3 Cu:0.01 MgO:1.25 SF (0.5% K$_2$O) | 326 | 470 | 62 | 32 |
| Fe:0.3 Cu:0.02 MnO:1.25 SF (0.5% K$_2$O) | 327 | 465 | 64 | 46 |
| Fe:0.3 Cu:0.02 MnO:1.25 SF | 329 | 465 | 60 | 49 |
| Fe:0.3 Cu:0.02 MgO:1.25 SF | 330 | 470 | 46 | 31 |
| Fe:0.3 Cu:0.02 MnO:1.25 SF (2.0% K$_2$O) | 335 | 475 | 88 | 33 |
| Fe:0.02 MnO:1.25 SF (0.5% K$_2$O) | 336 | 460 | 50 | 48 |
| Fe:0.3 Cu:0.1 TiO$_2$:1.25 SF (0.5% K$_2$O) | 337 | 460 | 84 | 47 |
| Fe:0.3 Cu:0.02 MnO:0.03 Al$_2$O$_3$:1.25 SF (0.5% K$_2$O) | 340 | 465 | 74 | 25 |
| Co:0.15 MgO:0.02 Al$_2$O$_3$:2 SF | 351 | 359 | 161 | 193 |
| Co:0.15 MgO:0.05 Al$_2$O$_3$:2 SF | 352 | 375 | 141 | 204 |
| Co:0.15 MgO:0.10 Al$_2$O$_3$:2 SF | 353 | 434 | 61 | 182 |
| Co:0.05 Al$_2$O$_3$:2 SF | 354 | 386 | 125 | 206 |
| Ni:0.25 ThO$_2$:1.25 SF | KF-21-1 | 378 | 91 | 209 |
| Ni:0.20 MnO:0.09 Al$_2$O$_3$:1.2 SF | KF-10-1 | 388 | 114 | 188 |

The tests shown in the above table indicate several conclusions with regard to the Super-Filtrol supported catalysts. It is preferred to maintain the ratio of Super-Filtrol to cobalt less than 5 since higher quantities of Super-Filtrol result in a substantially inactive catalyst. A 4-component catalyst, including cobalt, magnesia, alumina and Super-Filtrol, was found to be highly active and, in some cases, more active than the 3-component catalyst without the alumina. In this 4-component catalyst the aluminia content should be maintained below about 0.1 parts by weight with respect to cobalt, the preferred range being between about 0.01 and about 0.05 alumina. Another 4-component catalyst comprising iron, copper, cobalt and Super-Filtrol was also found to be highly active and superior to the 3-component catalyst without the use of cobalt. Another 4-component catalyst similar to the above, containing nickel instead of cobalt, was also found to be a good synthesis catalyst. As a general rule for all catalysts cobalt was superior to nickel either when the cobalt was the base material or when the cobalt was employed in small quantity as a promoter. With the 4-component iron catalyst a small amount of alkali, such as potassium oxide, increased the activity of the catalyst for the production of normally liquid organic compounds. The optimum amount of potassium oxide was approximately 0.5% by weight calculated as the oxide. Various other conclusions may be obtained by examination of the above table.

In general, the temperature of reaction employing bentonite supported catalysts is between about 350 and about 550° F., and preferably the temperature is maintained above about 435° F. for satisfactory operation in a fluidized system. In all instances the temperature of reaction is maintained below the temperature at which substantial degradation reactions occur. At temperatures of 350 to 500° F. space velocities of 50 to 5000, preferably 300 to 2000, standard volumes of reactants per hour per volume of fluidized catalyst in the reactor are satisfactory. Pressures below 50 pounds per square inch gage are generally employed, pressure being between about atmospheric and about 50 pounds per square inch gage. Higher space velocities are associated with higher temperatures and higher pressures. The hydrogen to carbon monoxide ratio in the total feed gas entering the reactor is maintained between about 1:1 to about 5:1 or higher, and generally the mol per cent of carbon monoxide is less than 25 per cent in the total gas entering the reactor. The hydrogen and carbon monoxide are the principal reactants of the feed, although this does not exclude the use of other gases, such as nitrogen, methane, etc., as diluent gases, or the use of olefins and products of the process which may enter into reaction with the products of the hydrogenation reaction or with the reactants themselves. In any case, however, the primary reaction and conditions employed are such that carbon monoxide is hydrogenated to produce normally liquid organic compounds as the principal product of the process. For a more complete discussion of the operating conditions and synthesis technique in general, reference may be had to application S. N. 47,184, filed September 1, 1948, now U. S. Patent No. 2,615,035, by Louis C. Rubin, Earl W. Riblett and Henry G. McGrath.

We claim:

1. A process for the hydrogenation of a carbon oxide to produce normally liquid organic compounds which comprises flowing a gaseous mixture comprising hydrogen and a carbon oxide as the principal reactants upwardly in a reaction zone in contact with finely divided contact material comprising a hydrogenating type metal of Group VIII of the Periodic System in combination with a metal oxide promoter for the hydrogenation of carbon oxide in an amount between about 0.01 and about 0.5 times the weight of the hydrogenating metal and a support therefor consisting essentially of an acid treated bentonite type clay in an amount between about 0.5 and about 5 times the weight of the hydrogenating metal, passing the gaseous mixture through said reaction zone at a velocity effective to suspend said finely divided contact material in gases therein, maintaining a temperature of reaction between about 350° F. and about 500° F., withdrawing from said reaction zone a gaseous effluent containing normally liquid organic compounds, and recovering normally liquid organic compounds from said gaseous effluent, said contact material having been prepared by mixing finely divided acid treated bentonite type clay heated to a temperature of about 180 to about 210° F. with a heated aqueous solution containing a precipitate obtained by adding a first boiling aqueous solution of a water soluble salt of said hydrogenating type metal and a water soluble salt of said metal capable of promoting the reaction to a second boiling aqueous alkaline solution, recovering solid contact material from the resulting mixture, partially drying said recovered contact material, extruding the partially dried contact material, drying the extruded contact material to contain a minor proportion of water, pulverizing the extruded and dried contact material, and then subjecting same to reduction with hydrogen at an elevated temperature.

2. A process for the hydrogenation of carbon monoxide to produce normally liquid organic compounds which comprises flowing a gaseous mixture comprising hydrogen and carbon monoxide as the principal reactants upwardly in a reaction zone in contact with finely divided contact material comprising a hydrogenating type metal of Group VIII of the Periodic System in combination with a metal oxide promoter for the hydrogenation of carbon monoxide in an amount between about 0.05 and about 0.2 times the weight of the hydrogenating metal and a support therefor consisting essentially of an acid treated bentonite type clay in an amount between about 1 and about 3 times the weight of the hydrogenating metal, passing said gaseous mixture through said reaction zone at a velocity effective to suspend said finely divided contact material in gases therein, maintaining a temperature of reaction between about 350° F. and about 500° F., withdrawing from said reaction zone a gaseous effluent containing normally liquid organic compounds, and recovering normally liquid organic compounds from said gaseous effluent, said contact material having been prepared by mixing finely divided acid treated bentonite type clay heated to a temperature of about 180 to about 210° F. with a heated aqueous solution containing a precipitate obtained by adding a first boiling aqueous solution of a water soluble salt of said hydrogenating type metal and a water soluble salt of said metal capable of promoting the reaction to a second boiling aqueous alkaline solution, recovering solid contact material from the resulting mixture, partially drying said recovered contact material, extruding the partially dried contact material, drying the extruded contact material to contain a minor proportion of water, pulverizing the extruded and dried contact material, and then subjecting same to reduction with hydrogen at an elevated temperature.

3. A process for the hydrogenation of carbon monoxide to produce normally liquid organic compounds which comprises flowing a gaseous mixture comprising hydrogen and carbon monoxide as the principal reactants upwardly in a reaction zone in contact with finely divided contact material comprising a hydrogenating type metal of Group VIII of the Periodic System in combination with a metal oxide promoter for the hydrogenation of carbon monoxide in an amount between about 0.01 and about 0.5 times the weight of the hydrogenating metal and a support therefor consisting essentially of an acid treated bentonite type clay in an amount between about 0.5 and about 5 times the weight of the hydrogenating metal, passing said gaseous mixture through said finely divided contact material at a velocity effective to suspend said contact material in gases in said reaction zone in a dense fluidized pseudo-liquid condition in which the particles of said contact material circulate in said mass at a high rate, maintaining a temperature of reaction between about 350° F. and about 500° F., and a space velocity between about 50 and about 5000 standard volumes of reactants per hour per volume of fluidized dense phase, withdrawing from said reaction zone a gaseous effluent containing normally liquid organic compounds, and recovering from said gaseous effluent normally liquid organic compounds, said contact material having been prepared by mixing finely divided acid treated bentonite type clay heated to a temperature of about 180 to about 210° F. with a heated aqueous solution containing a precipitate obtained by adding a first boiling aqueous solution of a water soluble salt of said hydrogenating type metal and a water soluble salt of said metal capable of promoting the reaction to a second boiling aqueous alkaline solution, recovering solid contact material from the resulting mixture, partially drying said recovered contact material, extruding the partially dried contact material, drying the extruded contact material to contain a minor proportion of water, pulverizing the extruded and dried contact material, and then subjecting same to reduction with hydrogen at an elevated temperature.

4. A process for the hydrogenation of carbon monoxide to produce normally liquid organic compounds which comprises flowing a gaseous mixture comprising hydrogen and carbon monoxide as the principal reactants upwardly in a reaction zone in contact with finely divided contact material comprising cobalt in combination with a metal oxide promoter for the hydrogenation of carbon monoxide in an amount between about 0.05 and about 0.2 times the weight of cobalt and a support therefor consisting essentially of an acid treated bentonite type clay in an amount between about 1 and about 3 times the weight of cobalt, passing said gaseous mixture through said reaction zone at a velocity effective to suspend said finely divided contact material in gases therein, maintaining a temperature of reaction between about 350° F. and about 500° F., withdrawing from said reaction zone a gaseous effluent containing normally liquid organic compounds, and recovering normally liquid organic compounds from said gaseous effluent, said contact material having been prepared by mixing finely divided acid treated bentonite type clay heated to a temperature of about 180 to about 210° F. with a heated aqueous solution containing a precipitate obtained by adding a first boiling aqueous solution of a water soluble salt of cobalt and a water soluble salt of said metal capable of promoting the reaction to a second boiling aqueous alkaline solution, recovering solid contact material from the resulting mixture, partially drying said recovered contact material, extruding the partially dried contact material, drying the extruded contact material to contain a minor proportion of water, pulverizing the extruded and dried contact material, and then subjecting same to reduction with hydrogen at an elevated temperature.

5. A process for the hydrogenation of carbon monoxide to produce normally liquid organic compounds which comprises continuously flowing a gaseous mixture comprising hydrogen and carbon monoxide as the principal reactants upwardly in a reaction zone through a mass of finely divided contact material consisting essentially of metallic cobalt, magnesia and acid treated montmorillonite as a support in parts by weight of 1:0.15:2, passing said gaseous mixture through said mass at a velocity effective to suspend said mass in said gas stream in a dense fluidized pseudo-liquid condition in which the particles of contact material circulate in said mass at a high rate, maintaining a temperature of reaction between about 350° F. and about 500° F., and a space velocity between about 300 and about 2000 standard volumes of reactants per hour per volume of fluidized dense phase such that carbon monoxide is converted to normally liquid organic compounds, withdrawing from said reaction zone a gaseous effluent containing normally liquid organic compounds, and recovering normally liquid organic compounds from said effluent, said contact material having been prepared by mixing finely divided acid treated montmorillonite heated to a temperature of about 180 to about 210° F. with a heated aqueous solution containing a precipitate obtained by adding a first boiling aqueous solution of a water soluble salt of cobalt and a water soluble salt of magnesium to a second boiling aqueous alkaline solution, recovering solid contact material from the resulting mixture, partially drying said recovered contact material, extruding the partially dried contact material, drying the extruded contact material to contain a minor proportion of water, pulverizing the extruded and dried contact material, and then subjecting same to reduction with hydrogen at an elevated temperature.

References Cited in the file of this patent

UNITED STATES PATENTS

| | | |
|---|---|---|
| 2,266,161 | Campbell | Dec. 16, 1941 |
| 2,339,927 | Heckel | Jan. 25, 1944 |
| 2,347,682 | Gunness | May 2, 1944 |
| 2,360,787 | Murphree et al. | Oct. 17, 1944 |
| 2,365,029 | Voorhies, Jr. | Dec. 12, 1944 |
| 2,398,899 | Teter | Apr. 23, 1946 |
| 2,406,864 | Thomas | Sept. 3, 1946 |
| 2,414,276 | Sensel et al. | Jan. 14, 1947 |
| 2,417,164 | Huber, Jr. | Mar. 11, 1947 |
| 2,443,673 | Atwell | June 22, 1948 |
| 2,447,505 | Johnson | Aug. 24, 1948 |